United States Patent [19]

Quick et al.

[11] Patent Number: 4,757,940
[45] Date of Patent: Jul. 19, 1988

[54] OVENABLE PAPERBOARD FOOD TRAY

[75] Inventors: James R. Quick, Warwick; James W. Mitchell, Newburgh, both of N.Y.

[73] Assignee: International Paper Company, Purchase, N.Y.

[21] Appl. No.: 860,736

[22] Filed: May 7, 1986

[51] Int. Cl.⁴ .......................... B65D 3/00; B65D 5/24
[52] U.S. Cl. ................................ 229/3.5 R; 426/523; 229/903
[58] Field of Search ................ 229/903, 3.5; 426/523; 106/15

[56] References Cited

U.S. PATENT DOCUMENTS

| | | | |
|---|---|---|---|
| 2,381,487 | 8/1945 | Cook et al. | 106/15 |
| 2,407,118 | 9/1946 | Waters | 229/903 |
| 2,769,729 | 11/1956 | Van de Zande et al. | 117/137 |
| 3,223,579 | 12/1965 | Dorland et al. | 162/123 |
| 3,819,518 | 6/1974 | Endler | 252/8.1 |
| 3,904,104 | 9/1975 | Kane | 229/903 |
| 3,924,013 | 12/1975 | Kane | 426/523 |
| 4,147,836 | 4/1979 | Middleton et al. | 428/481 |
| 4,173,666 | 11/1979 | Quinto | 427/427 |
| 4,307,148 | 12/1981 | LeBlanc | 428/275 |
| 4,337,116 | 6/1982 | Foster et al. | 162/158 |
| 4,391,833 | 7/1983 | Self et al. | 426/523 |
| 4,418,119 | 11/1983 | Morrow et al. | 229/903 |
| 4,421,825 | 12/1983 | Seiter | 428/332 |

*Primary Examiner*—Willis Little

[57] ABSTRACT

An ovenable food tray formed from paperboard, the food-containing surface of which is coated with a food grade resin. The other surface of the paperboard is adhered to a paper coated with an essentially nonburning coating. This paperboard-adhesive-paper laminate yields improved flame resistance, particularly in electric ovens where the food tray may be accidentally placed very near an oven heating element.

39 Claims, No Drawings

OVENABLE PAPERBOARD FOOD TRAY

BACKGROUND OF THE INVENTION

This invention relates to ovenable food containers and more particularly to an ovenable food tray formed from a paper and paperboard laminate. The tray is formed from a laminated board having resistance to flaming.

The prior art is aware of ovenable food trays of the type which exhibit at least partial resistance to browning, discoloration, and flaming, such trays being packaged with food products therein and adapted to be placed in an oven, such as a conventional gas or electric oven or a microwave oven. It is conventional to fashion a food tray from a paperboard stock coated on one side with a heat-resistant polymeric coating, and it is well known that the paperboard may be treated with a flame retardant material and also coated on the nonfood contacting surface with a pigmented layer, for the purpose of inhibiting of discoloration due to elevated temperatures.

In the use of paperboard trays as food containers in gas ovens or microwaves ovens, severe problems of discoloration or flaming are not as pronounced as is sometimes the case when an electric oven is employed. Often, the user of the food package may place the tray very near a heating element, thereby causing severe local heating which sometimes results in flaming of the container or glowing and ashing of the portion most directly over the element. Prior art coating and impregnating substances have, in general, not completely overcome problems of flaming, glowing and ashing of paperboard trays that are subjected to severe heating conditions.

SUMMARY OF THE INVENTION

This invention relates to a paperboard tray which exhibits markedly improved flame resistance by laminating the paperboard, on its non food-contacting surface with a paper coated with an essentially nonburning coating such as a silicone polymer coating or a highly pigmented coating of the sort generally used on publication grade papers. The coated paper is suitably affixed to the non food-containing surface of the paperboard by means of an adhesive, typically polyvinyl acetate (PVA). The resultant tray is thus defined by a laminate of paperboard and paper secured together by the adhesive.

The invention may be practiced by, basically, coating the food contacting surface of a paperboard substrate with a food grade resin, such as polyethelyene terephthalate (PET). Next, a conventional flame retardant treatment such as a solution of boric acid in propylene glycol may be applied to the non food-contacting surface of the paperboard and allowed to penetrate it. Next, an adhesive is applied, typically polyvinyl acetate, over this non food-contacting paperboard surface. Next, a paper stock such as a silicone coated paper is applied to the adhesive or, alternatively, a printing grade coated paper is applied to the adhesive. Thereafter, the resulting paperboard-adhesive-paper laminate is subjected to pressure or possibly a combination of heat and pressure in a platen press or between laminating rollers. The thus prepared laminated stock material is converted into, typically, a 3-compartment dinner tray using known methods of pressure-forming paperboard trays. Thereafter, the paperboard tray is filled with food products and is packaged and is ready for shipment and subsequent consumption.

DETAILED DESCRIPTION OF THE INVENTION

In the examples which follow, it will be understood that the term silicone coated paper refers to paper which has been coated with a cured, heat resistant silicone polymer coating. The terms publication paper or publication grade paper or litho paper refers to paper which has been coated on one or both sides with a water-based coating with a high pigment content of the type typically applied to paper to provide a bright, smooth, ink-receptive printable surface. The term food grade resin refers to any resin, such as polyethelyene teraphthalate which has been approved by regulatory agencies for use as the food contacting component of packaging materials intended for food storage and heating of food within the package.

The following examples (1–3) were produced by coating and laminating the materials in the form of individual sheets using laboratory methods, then forming the laminated material into trays using a single-cavity forming machine.

EXAMPLE 1

The starting material for this example was bleached paperboard extrusion-coated on one side with polyester resin (polyethylene terephthalate). The basis weight of the paperboard was 215 lb per 3000 sq. ft. and the weight of the polyester coating was about 25 lb per 3000 sq. ft. A piece of the polyester-coated paperboard was first treated with a solution of boric acid dissolved in propylene glycol, containing 20% boric acid. The treatment solution was applied on the uncoated side of the polyester-coated paperboard using a standard #11 wire-wound coating rod. Next, a piece of commercially-available silicone-coated paper was cut to size to match the piece of paperboard. This silicone-coated paper was obtained from Akrosil Company and was identified as SBL 42 SC Silox 1U/0. This paper had the silicone coating on only one side of a semibleached, super-calendered base sheet, with a basis weight of 42 lb per 3000 sq. ft. An adhesive was prepared by combining equal weights of a commercial polyvinyl-acetate adhesive (V-6036 from H. B. Fuller Co.) and a 7% solution of polyvinyl alcohol (Vinol grade 165 from Air Products Co.). The blended adhesive was applied on the uncoated side of the silicone-coated paper with a standard #11 wire-wound coating rod and air-dried. The laminated stock of this example was produced by placing the adhesive-coated side of the paper against the side of the paperboard treated with the propylene glycol/boric acid solution, and then subjecting this combination to heat and pressure in a laboratory platen press, heated to about 200° F.

The laminated stock prepared in the manner just described was converted to 3-compartment TV dinner trays using known methods of pressure-forming paperboard trays, consisting of the steps of first cutting and creasing a blank using a steel-rule die, and then placing the blank in a 2-piece forming die where the paperboard is simultaneously drawn into the die and shaped to form the contours of the tray.

The formed paperboard tray of this example was tested to determine its resistance to flaming under extreme oven conditions. First, frozen food was placed in the tray consisting of mashed potatoes and whole kernel corn in each of the small compartments and a chicken pattie in the large compartment. In this test the chicken pattie covered about half of the total area of the large compartment of the tray. The test conditions were selected to subject the trays to abusive cooking conditions of a more extreme nature than would generally be encountered in normal household ovens. These conditions include the use of a specific make and model of oven that has a short distance of only about 1" between the heating element and the bottom rack of the oven. The test conditions are as follows:

Extreme-case Cooking Test Conditions

Jenn-Air Electric Oven—Model S 125
Line voltage to oven=230-235 Volts
Thermostat set at 500° F.
Oven fully preheated
2 trays on bottom rack of oven directly over the portion of the element providing maximum exposure (maximum length of element under each tray)
No cookie sheet under trays
Foil liner on bottom of oven, under the element
Test run for 60 min. (or to the point of flaming)
Oven door opened at 15 min., 30 min., and 45 min The trays of this example, when tested at the abusive conditions outlined above exhibited no flaming, no ashing and no glowing in a series of 10 separate tests—a total of 20 trays. All tests were run for a full hour.

For comparison, tests were run with standard trays made from paperboard coated with polyester resin, but without the additonal components of the flame resistant tray of this example. The standard trays flamed consistently within 90-105 seconds after the beginning of the test.

EXAMPLE 2

The starting material for this example was bleached paperboard (215 lb per 3000 sq. ft.) coated with a white-pigmented polyester resin (27 lb. per 3000 sq. ft.). In this example the adhesive was a blend of the H. B. Fuller product V 6036 with 10% propylene glycol. This adhesive was applied to the uncoated side of the paperboard with a standard #11 wire-wound coating rod. No boric acid treatment was applied to the paperboard of this example. A piece of the silicone-coated paper, same as used in Example 1, was placed on the adhesive-coated surface of the paperboard with the uncoated side of the silicone-coated paper contacting the adhesive coated surface. This combination of materials was then pressed in the laboratory platen press at about 200° F. to produce the laminated stock of this example.

Trays were formed from the laminated stock in the same manner as described in Example 1 and these trays were tested for flame-resistance under the same conditions outlined in Example 1. As before, 10 tests were run, each with 2 trays in the oven together, each containing mashed potatoes, whole kernel corn and a chicken pattie. In this case, 7 sets of 2 trays passed the 1 hour test without flaming and 4 of these sets also showed no ashing or glowing. Standard trays made from polyester-coated paperboard were tested at the same time and these flamed in 105 seconds.

EXAMPLE 3

As in Example 2, the starting material for this example was bleached paperboard coated with white pigmented polyester resin. The blended adhesive of Example 2 was applied to the uncoated side of the paperboard with a standard #11 wire-wound coating rod. No additional treatment was applied to the paperboard. In this case, the silicone-coated paper used in Examples 1 and 2 was replaced with a 40 lb white publication paper with a conventional highly pigmented coating on both sides. The paper was applied to the adhesive coated surface of the paperboard and the combination was pressed in the laboratory platen press at 200° F.

Trays were formed in the manner already described and tested under the same abusive cooking conditions used to test the trays of Example 1 and 2, with the same types of food. In this case, 5 sets of 2 trays were tested for 1 hour with no incident of flaming. In 4 out of 5 tests there was some ashing of the trays. Standard trays made from polyester-coated paperboard were tested at the same time and these flamed in 85-90 seconds.

Pilot-Scale Work

The following examples (4 and 5) were produced by coating and laminating the materials in the form roll-stock on a semi-commercial scale laminating machine. On this machine, the adhesive was applied with either a 55-line gravure roll or a 110-line gravure roll, and the propylene glycol/boric acid solution, when used, was applied with a 110-line gravure roll. In Example 4 the trays were formed from the laminated stock using a single-cavity tray-forming machine, as in Examples 1-3. In Example 5 trays were formed on a production-scale tray-forming machine.

EXAMPLE 4

The starting material for this example was bleached paperboard (282 lb per 3000 sq. ft.) coated with a tan-pigmented polyester resin (27 lb per 3000 sq. ft.). The laminating machine was set up with the polyester-coated paperboard running first through the station with the 110-line gravure roll applying the propylene glycol/boric acid solution and then directly through the station with the 55-line gravure roll applying the adhesive, with both applications made on the side of the paperboard opposite the polyester coating. In this example the adhesive was a vinyl-acetate adhesive from H. B. Fuller Co. coded XJ-145. After passing through both gravure stations the paperboard went into the laminating nip where it was combined with a silicone-coated paper of the same description as that used in Example 1 and 2. The uncoated side of this paper was pressed against the adhesive-coated surface of the paperboard so that the coated surface of the paper was exposed on the combined material. The laminated stock was run through an oven at 250° F. and then wound into a roll.

Trays were formed from the laminated stock of this example in the same manner as in the previous examples (1-3) and these were tested in the same manner as the trays in those examples. In a series of 10 tests, 20 trays total, there were only 2 cases of trays flaming. In the 8 tests with no flaming, there was also no ashing or glowing of the trays. Standard trays made from polyester-coated paperboard were tested at the same time and these flamed in 100-105 seconds.

EXAMPLE 5

In this example the starting material was bleached paperboard coated with white-pigmented polyester resin, the same as used in Examples 2 and 3. The pilot-scale laminating machine was set up with the polyester-coated paperboard running through the station with the 110-line gravure roll to apply a blended adhesive on the uncoated side of the paperboard. In this example, the adhesive was prepared by mixing the H. B. Fuller product XJ-145 with a solution of polyvinyl alcohol. The blended adhesive contained 2.4% polyvinyl alcohol, Vinol grade 107 from Air Products Co. No boric acid treatment was applied to the paperboard in this example. After the application of the adhesive, the paperboard went into the laminating nip where it was combined with a 60 lb litho printing paper, coated on one side with a conventional highly pigmented coating. No heat was applied to the laminated product. The product was run at 300 fpm and wound into a roll.

The laminated stock comprised of polyester coated paperboard and litho paper was next printed on the litho paper surface with an overall pattern of a solid tan background with brown speckles, and then a clear printing varnish was applied over the printed surface. These steps were performed on a conventional flexographic printing press with commercial water-based flexographic inks and varnish.

Trays were formed from the laminated and printed stock of this example on a production-scale tray forming machine, producing trays simultaneously in 3 forming dies, running at 15-20 cycles per minute.

The tests were tested in the same manner as described in the previous examples to assess their resistance to flaming under abusive cooking conditions. In a series of 10 tests (20 trays) there were no cases of flaming and only 2 cases of ash formation on the edge of the trays.

In the examples that have been presented specific materials were employed as adhesives for securing the coated papers to the paperboard. It is to be recognized that other adhesive materials may be used for this purpose, such as acrylic latex adhesives or SBR latex adhesives which, like the adhesives used in the above examples, are conveniently applied from a water medium.

Other flame retardant additives, other than boric acid, can be applied to the paperboard within the context of this invention. For example, sodium phosphate and sodium borate both contribute flame retardancy to the paperboard and both are safe to use in food packaging materials.

Further, other essentially nonburning coatings can be used on coated papers suitable for combination with paperboard in the practice of this invention. Examples of such nonburning coatings that can be applied to paper via known methods include sodium silicate coatings which can be applied from water and metallic coatings which can be applied by vacuum deposition such as an aluminum coating.

The laminate may be molded into the form of trays by known processes, such as shown in U.S. Pat. No. 4,026,458 to Morris et al, incorporation by reference.

We claim:

1. An ovenable food tray having resistance to flaming when subjected to elevated temperatures, the tray being in the form of a laminate, one layer of which is paperboard coated on its food contacting surface with a food grade resin, the other surface of the paperboard having adhered thereto a paper coated with an essentially non-burning coating, wherein said coating is heavily pigmented.

2. The food tray of claim 1 wherein the food grade resin is a polyester.

3. The food tray of claim 2 wherein the polyester is polyethlene terephthlate.

4. The food tray of claim 1 wherein the paperboard is impregnated with a flame retardant material.

5. The food tray of claim 4 wherein the flame retardant is boric acid.

6. The food tray of claim 1 wherein a vinyl-acetate adhesive is employed to secure the coated paper to the paperboard layer.

7. The food tray of claim 1 wherein the coated paper is printed with ink to provide a decorative tray exterior.

8. The food tray of claim 7 wherein a clear printing varnish, is applied over the printed surface of the coated paper.

9. A laminated board having resistance to flaming when subjected to elevated temperatures, one laminated layer of which is paperboard coated on one surface, termed a food contacting surface, with a food resin, the other surface of the paperboard having adhered thereto a paper coated with an essentially non-burning coating, wherein said coating is heavily pigmented.

10. The laminated board of claim 9 wherein the food grade resin is a polyester.

11. The laminated board of claim 10 wherein the polyester is polyethelyene terephthalate.

12. The laminated board of claim 9 wherein the paperboard is impregnated with a flame retardant material.

13. The laminated board of claim 12 wherein the flame retardant is boric acid.

14. The laminated board of claim 9 wherein a vinyl-acetate adhesive is employed to secure the coated paper to the paperboard layer.

15. The laminated board of claim 9 wherein the coated paper is printed with ink to provide a decorative tray exterior.

16. The laminated board of claim 15 wherein a clear printing varnish is applied over the printed surface of the coated paper.

17. A method of making a laminated board resistant to flaming, the method including the steps of securing, by means of an adhesive, the uncoated side of a sheet of single sided coated silicone-coated paper to the uncoated side of a paperboard sheet having on one side a coating of a polyester resin, and laminating the paperboard and silicone-coated paper together.

18. The method of claim 17 including the additional step of treating the uncoated side of the paperboard with a flame retardant material.

19. The method of claim 18 wherein the flame retardant material is a solution of boric acid dissolved in propylene glycol.

20. A method of making a laminated board resistant to flaming, the method including the steps of securing, by means of an adhesive, the uncoated side of a sheet of single sided coated silicone-coated paper to the uncoated side of a paperboard sheet having on one side a pigmented polyester resin and laminating the paperboard and silicone-coated paper together.

21. The method of claim 20 wherein the pigmented polyester resin is white pigmented.

22. The method of claim 20 wherein the pigmented polyester resin is tan pigmented.

23. The method of claim 20 including the additional step of treating the uncoated side of the paperboard with a flame retardant material.

24. A method of making a laminated board resistant to flaming, the method including the steps of securing, by means of an adhesive, a sheet of paper coated with an essentially nonburning coating to the uncoated side of a paperboard sheet having on one side a coating of a food grade resin, and laminating the paperboard and paper together.

25. The method of claim 24 wherein the food grade resin is a polyester resin.

26. The method of claim 25 wherein the polyester resin is white or tan pigmented.

27. The method of claim 24 including the additional step of treating the uncoated side of the paperboard with a flame retardant material.

28. An ovenable food tray having resistance to flaming when subjected to elevated temperatures, the tray being in the form of a laminate, one layer of which is paperboard coated on its food contacting surface with a food grade resin, the other surface of the paperboard having adhered thereto a paper coated with an essentially non-burning coating, wherein said coating is a cured silicone polymer.

29. The food tray of claim 28 wherein the food grade resin is a polyester.

30. The food tray of claim 29 wherein the polyester is polyethylene terephthalate.

31. The food tray of claim 28 wherein the paperboard is impregnated with a flame retardant material.

32. The food tray of claim 31 wherein the flame retardant is boric acid.

33. The food tray of claim 28 wherein a vinyl-acetate adhesive is employed to secure the coated paper to the paperboard.

34. A laminated board having resistance to flaming when subjected to elevated temperatures, one laminate layer of which is paperboard coated on one surface, termed a food contacting surface, with a food grade resin, the other surface of the paperboard having adhered hereto a paper coated with an essentially non-burning coating.

35. The laminated board of claim 34 wherein the food grade resin is a polyester.

36. The laminated board of claim 35 wherein the polyester is polyethylene terephthalate.

37. The laminated board of claim 34 wherein the paperboard is impregnated with a flame retardant material.

38. The laminated board of claim 37 wherein the flame retardant is boric acid.

39. The laminated board of claim 34 wherein a vinyl-acetate adhesive is employed to secure the coated paper to the paperboard layer.

* * * * *